(12) United States Patent
Biskeborn et al.

(10) Patent No.: US 7,266,880 B2
(45) Date of Patent: Sep. 11, 2007

(54) METHOD OF MAKING A MONOLITHIC MAGNETIC READ-WHILE-WRITE HEAD APPARATUS

(75) Inventors: Robert Glenn Biskeborn, Hollister, CA (US); James Howard Eaton, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 737 days.

(21) Appl. No.: 10/672,880

(22) Filed: Sep. 26, 2003

(65) Prior Publication Data

US 2004/0060163 A1  Apr. 1, 2004

Related U.S. Application Data

(62) Division of application No. 09/877,382, filed on Jun. 7, 2001, now Pat. No. 6,646,830.

(51) Int. Cl.
*G11B 5/127* (2006.01)
*H04R 31/00* (2006.01)

(52) U.S. Cl. .......... 29/603.15; 29/417; 29/603.11; 29/603.13; 29/603.16; 29/603.18; 216/65; 427/127; 427/128; 451/5; 451/41

(58) Field of Classification Search .......... 29/417, 29/603.11, 603.13–603.16, 603.18; 216/65; 360/121, 126, 129, 316, 317; 427/127, 128; 451/5, 41
See application file for complete search history.

(56) References Cited

U.S. PATENT DOCUMENTS

| 3,937,579 | A | | 2/1976 | Schmidt | 356/144 |
|---|---|---|---|---|---|
| 4,685,005 | A | * | 8/1987 | Fields, Jr. | 360/53 |
| 4,967,300 | A | * | 10/1990 | Reid et al. | 360/122 |
| 5,027,245 | A | * | 6/1991 | Nagata et al. | 360/121 |
| 5,051,379 | A | | 9/1991 | Bayer et al. | 437/225 |
| 5,218,498 | A | * | 6/1993 | Jagielinski | 360/316 |
| 5,321,882 | A | | 6/1994 | Zarouri et al. | 29/603 |
| 5,331,493 | A | * | 7/1994 | Schwarz | 360/316 |
| 5,335,127 | A | * | 8/1994 | Nagata et al. | 360/316 |
| 5,406,163 | A | | 4/1995 | Carson et al. | 310/334 |
| 5,528,819 | A | | 6/1996 | McKay et al. | 29/603.07 |
| 5,541,793 | A | * | 7/1996 | Schwarz | 360/121 |
| 5,694,677 | A | | 12/1997 | Tsunoda | 29/603.12 |
| 5,697,144 | A | | 12/1997 | Mitani et al. | 29/611 |
| 5,738,757 | A | | 4/1998 | Burns et al. | 156/644.3 |
| 5,739,067 | A | | 4/1998 | DeBusk et al. | 438/618 |
| 5,821,167 | A | | 10/1998 | Fukami et al. | 438/691 |
| 5,842,269 | A | | 12/1998 | Albertini et al. | 29/603.13 |
| 5,982,591 | A | * | 11/1999 | Folkerts et al. | 360/121 |
| 6,097,571 | A | * | 8/2000 | Draaisma et al. | 360/125 |
| 6,404,191 | B2 | * | 6/2002 | Daughton et al. | 324/252 |

\* cited by examiner

*Primary Examiner*—Paul D. Kim
(74) *Attorney, Agent, or Firm*—William D. Gill; Jeffrey P. Aiello

(57) ABSTRACT

A method for fabricating a multi-track thin-film magnetoresistive tape head with precisely-aligned read/write track-pairs fabricated on a monolithic substrate wafer is provided. The wafer is fabricated using modified standard thin-film processes for fabricating direct access storage device heads and modified substrate lapping procedures. Gap-to-gap separation within each read/write track-pair is reduced to nearly the thickness of the substrate wafer. Fabricating on both sides of the wafer, may enable hundreds or thousands of head elements to be aligned in one step of the fabrication process while reducing the number of pieces in the completed head assembly.

6 Claims, 5 Drawing Sheets

METHOD OF MAKING A MONOLITHIC MAGNETIC READ-WHILE-WRITE HEAD APPARATUS

REFERENCE TO RELATED APPLICATION

This is a divisional application of Ser. No. 09/877,382 filed Jun. 7, 2001, now U.S. Pat. No. 6,646,830.

BACKGROUND OF THE INVENTION

1. Field of the Invention

This invention relates generally to read/write head arrays for magnetic data stores and more particularly to a monolithic magnetic read-while-write tape head.

2. Description of the Prior Art

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in gigabytes on 384 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM Corporation. The MR sensor transduces magnetic field changes in a MR stripe to resistance changes, which are processed to provide digital signals. Data storage density can be increased because a MR sensor offers signal levels much higher than those available from conventional inductive read heads for a given bit area. Moreover, the MR sensor output signal depends only on the instantaneous magnetic field intensity in the storage medium and is independent of relative sensor/medium velocity and the magnetic field time-rate-of-change.

The quantity of data stored on a magnetic tape may be increased by increasing the number of data tracks on the tape, which also decreases the distance between adjacent tracks. The width of the data tracks written by the read/write head assembly is limited by the width of the magnetic pole pieces in the write element but this track-width can be much narrower than the write element itself, which includes a write coil to energize the head gap. Present multi-channel tape recording systems achieve data track densities on the tape medium of twelve or more times the recording element density in the read/write head assembly.

In modern magnetic tape recorders adapted for computer data storage, the magnetic head assembly offers a read-while-write capability that is an essential feature for providing virtually error free magnetically stored data. Providing this bi-directional read-while-write capability usually requires fabrication and assembly of two or three separate modules. In the three-module approach, modules containing arrays of read heads are aligned with and assembled on both sides of a center module containing an array of write heads. Thus, for both directions of tape travel, the tape first passes over a center write-module to be written and then immediately passes over a closely-spaced read module for reading of the data just written. This approach requires independent finishing of the air-bearing surface (ABS) on each of the three modules and the precise assembly of the three modules into a single recording head. In the two module interleaved approach, two identical modules are fabricated, each containing an array of alternating read and write elements, starting with, say, a read element and ending with a write element. These modules are then assembled 'face-to-face' so that a read element always faces a write element. When the tape is moving one direction, half of the write elements are followed closely by a read element. When moving the other direction, the other half of the write elements are followed by read elements, thereby supporting bi-directional read-while-write operation providing immediate read back verification of the data written onto the tape medium. Alternatively, each module may contain "piggy-back" elements consisting of combined read and write elements such as used in direct access storage device (DASD) heads to increase data rates.

By continually reading "just recorded" data, the quality of the recorded data is verified while the original data is still available in the temporary storage of the recording system for reuse if needed. The recovered data is compared to the original data to afford opportunity for action, such as re-recording, to correct errors. Alternate columns (track-pairs) are thereby disposed to read-after-write in alternate directions of tape medium motion or in the other approach, all columns are written or read in parallel. Tape heads suitable for reading and writing on high-density tapes require precise alignment of the track-pair elements in the head assembly, as well as tight control of the skew of the head in the drive relative to the direction of tape travel. This latter requirement is eased by reducing the spacing between the read and write elements in each track-pair. Thus, higher-density data storage on tape requires tighter control of read and write element spacing tolerances along both the transverse and the track-line dimensions of the tape head.

FIG. 1 shows the air bearing surface (ABS) of a prior art embodiment of an interleaved magnetoresistive (MR) head assembly 10, where the read elements are marked "R" and the write elements are marked "W". The write elements, exemplified by the write head 12 and the read elements, exemplified by the read head 14, are disposed in alternating fashion to form a single row of read/write track-pairs, exemplified by the R/W track-pair 12-14. As used herein, the term "alternating" is intended to include other formats. For example, one format provides that the odd-numbered heads H1, H3, H5 etc. are operative during forward tape movement, while the even-numbered heads H2, H4, H6 etc. are operative during the opposite direction of tape movement. Generally, the length of the magnetic tape medium 16 moves in either a forward or reverse direction as indicated by the arrows 18 and 20. Head assembly 10 is shown in FIG. 1 as if magnetic tape medium 16 were transparent, although such tape medium normally is not transparent. Arrow 18 designates a forward movement of tape medium 16 and arrow 20 designates a reverse direction. Magnetic tape medium 16 and interleaved MR head assembly 10 operate in a transducing relationship in the manner well-known in the art.

Each of the head elements in head assembly 10 is intended to operate over a plurality of data tracks in magnetic tape medium 16, as may be appreciated with reference to the data tracks T1, T9, T17, etc. in FIG. 1, which shows an exemplary 288-track scheme having a data track density on magnetic tape medium 16 of eight times the recording element density of R/W track-pairs H1, H2, ... H36 in MR head assembly 10. Tracks T9, T25, . . . T281 may be written with one pass of magnetic tape medium 16 in direction 18 over even-numbered R/W track-pairs H2, H4, . . . H36 and then tracks T1, T17, . . . T273 written on a return pass of magnetic tape medium 16 over the odd-numbered R/W track-pairs H1, H3, . . . H35 by moving the lateral position of MR head assembly 10 in the direction of the arrow 21 by a distance equivalent to one track pitch (T1–T2), which is about 12% of the RIW track-pair spacing (H1–H2).

Interleaved MR head assembly 10 includes two thin-film modules 22 and 24 of generally identical construction. Modules 22 and 24 are joined together with an adhesive layer 25 to form a single physical unit, wherein the R/W track-pairs are aligned as precisely as possible in the direction of tape medium movement. Each module 22, 24 includes one head-gap line 26, 28, respectively, where the individual R/W gaps in each module 26, 28 are precisely located. Each thin-film module 22, 24 includes a separate substrate 30, 32 and a separate closure piece 34, 36, respectively. Substrate 30 is bonded near head-gap line 26 by adhesive to closure piece 34 to form thin-film module 22 and substrate 32 is bonded near head-gap line 28 by adhesive to closure piece 36 to form thin-film module 24. As precisely as possible, head-gap lines 26, 28 are disposed perpendicular to the directions of tape medium movement as represented by arrows 18, 20. The R/W head-gaps at H1–H36 in thin-film module 22 cooperate with the corresponding R/W head-gaps in thin-film module 24 to provide read-after-write functionality during movement of magnetic tape medium 16. The read head gaps of one thin-film module are precisely aligned with the write head gaps of the other module along the direction of movement of tape medium 16. Thus, for example, write head 12 is aligned with read head 14 to form a single R/W track-pair for read-after-write during magnetic tape movement in the direction indicated by arrow 18.

Interleaved MR head assembly 10, as known in the art, is disadvantageously limited to a relatively large spacing between the cooperating read and write heads in each R/W track-pair because of the two closure pieces 34 and 36 required to cover each of the two substrates 30 and 32 as discussed above with respect to FIG. 1. Also, the two thin-film modules 22 and 24 (FIG. 1) must be aligned along the track line of motion of the tape medium and joined together within a small fraction of the data track width, which is a slow and expensive process with high spoilage rates during manufacture.

An alternate embodiment known in the art to the interleaved MR head structure described above with reference to FIG. 1 is the 'piggy-back' structure wherein a write element is fabricated using thin-film techniques immediately over a MR read element on each side of every R/W track-pair H1, H2, etc., so that the R and W elements shown in FIG. 1 all become "W piggy-backed-on R" elements. Within each piggy-back pair, the MR read head is too close to the overlying write head to permit reading while writing, but the MR read head on the other side of the R/W track-pair is aligned with the writing head and is distant enough to read while writing. The disadvantages of the interleaved MR head discussed above apply also to the "piggy-back" head known in the art. In an alternative prior art embodiment (not shown), the two modules 22, 24 are bonded at the substrates with the closure layers disposed outermost. Such a structure has similar disadvantages.

The present state of the art requires independent finishing of the air bearing surfaces for two or three modules to submicron precision and the independent precise assembly of these modules into a recording head, with much cost and difficulty. These unresolved problems and deficiencies are clearly felt in the art and are solved by this invention in the manner described below.

SUMMARY OF THE INVENTION

This invention solves the above problem by providing a method for fabricating multi-track thin-film magnetoresistive (MR) tape heads with precisely-aligned read/write (R/W) track-pairs fabricated on a monolithic substrate. As used herein, the term monolithic denominates an undivided seamless piece. The tape heads of this invention are fabricated from a single substrate wafer by using complete thin-film processing on both sides of the wafer. In a preferred embodiment, the head elements are aligned with readers opposite writers on the opposing sides of the monolithic substrate wafer. Many heads are fabricated on this single wafer. The wafer is built using modified standard thin-film processes for fabricating direct access storage device (DASD) heads and modified substrate lapping procedures. The advantages and features of this invention apply equally well to the "piggy-back" MR head structure, the interleaved MR head structure, and to many other thin-film magnetic recording head structures and this invention is to be limited only by the language of the claims set forth below.

It is a purpose of this invention to reduce the cost of separately fabricating, finishing and assembling each recording head by aligning many recording heads at once on both sides of a single wafer and eliminating the requirement for separate finishing of multiple modules for a single recording head. It is a feature of this invention that monolithic MR tape heads are fabricated on both surfaces of a single wafer.

It is another purpose of this invention to eliminate the usual requirement for a conductive shield between track-pair elements of a MR magnetic tape head. It is an advantage of the tape head of this invention that such cumbersome shield is unnecessary because the conductive substrate material provides all necessary shielding. However, it is also an advantage of the method of this invention that a thin film conductive layer such as, for instance, gold or copper, may be formed under the elements on either or both sides of the wafer for improved shielding.

The substrate wafer is processed using standard DASD-like processes and fabricated using standard flat or contoured lapping machines modified to include means for adjusting the angle of inclination between the wafer substrate and the lapping plate to achieve equal stripe height on either side of the wafer substrate. Electronic lapping sensors are provided for both sides of the wafer substrate.

In one aspect, the invention is a process for fabricating thin-film magnetic heads having an air bearing surface (AB S), including the steps of polishing the surface of a first side of a monolithic substrate wafer, forming thereon a first array of magnetic read head structures and magnetic write head structures each having a head gap, polishing the surface of the other side of the monolithic substrate wafer, forming thereon a second array of magnetic read head structures and magnetic write head structures disposed such that a plurality of the magnetic read head gaps on one of the monolithic substrate surfaces are each aligned to form a read/write track-pair with a corresponding one of the magnetic write head gaps on the other monolithic substrate surface, cutting the monolithic substrate to expose the head gaps of a plurality of read/write track-pairs, lapping the ABS to refine the depth of the exposed head gaps, and cutting the monolithic substrate to separate therefrom the thin-film magnetic head.

In a preferred embodiment, the invention is a thin-film magnetic tape head having an air bearing surface (ABS), including a monolithic substrate layer having two sides, a plurality of thin-film read head structures and thin-film write head structures disposed on a first side of the monolithic substrate layer, each having a head gap disposed at the ABS, a plurality of thin-film read head structures and thin-film write head structures disposed on a second side of the monolithic substrate layer, each having a head gap disposed at the ABS and aligned such that a plurality of the read head gaps on one of the monolithic substrate surfaces are each aligned to form a read/write track-pair with a corresponding one of the write head gaps on the other monolithic substrate surface.

In another embodiment, the invention is a magnetic tape drive including a magnetic recording medium having a recording surface, a motor for moving the magnetic recording medium, a thin-film magnetic tape head having an air bearing surface (ABS) and including a monolithic substrate layer having two sides, a plurality of thin-film read head structures and thin-film write head structures disposed on a first side of the monolithic substrate layer, each having a head gap disposed at the ABS, a plurality of thin-film read head structures and thin-film write head structures disposed on a second side of the monolithic substrate layer, each having a head gap disposed at the ABS and aligned such that a plurality of the read head gaps on one of the monolithic substrate surfaces are each aligned to form a read/write track-pair with a corresponding one of the write head gaps on the other monolithic substrate surface, and a head-mount assembly for supporting the magnetic tape head with respect to the magnetic recording medium.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
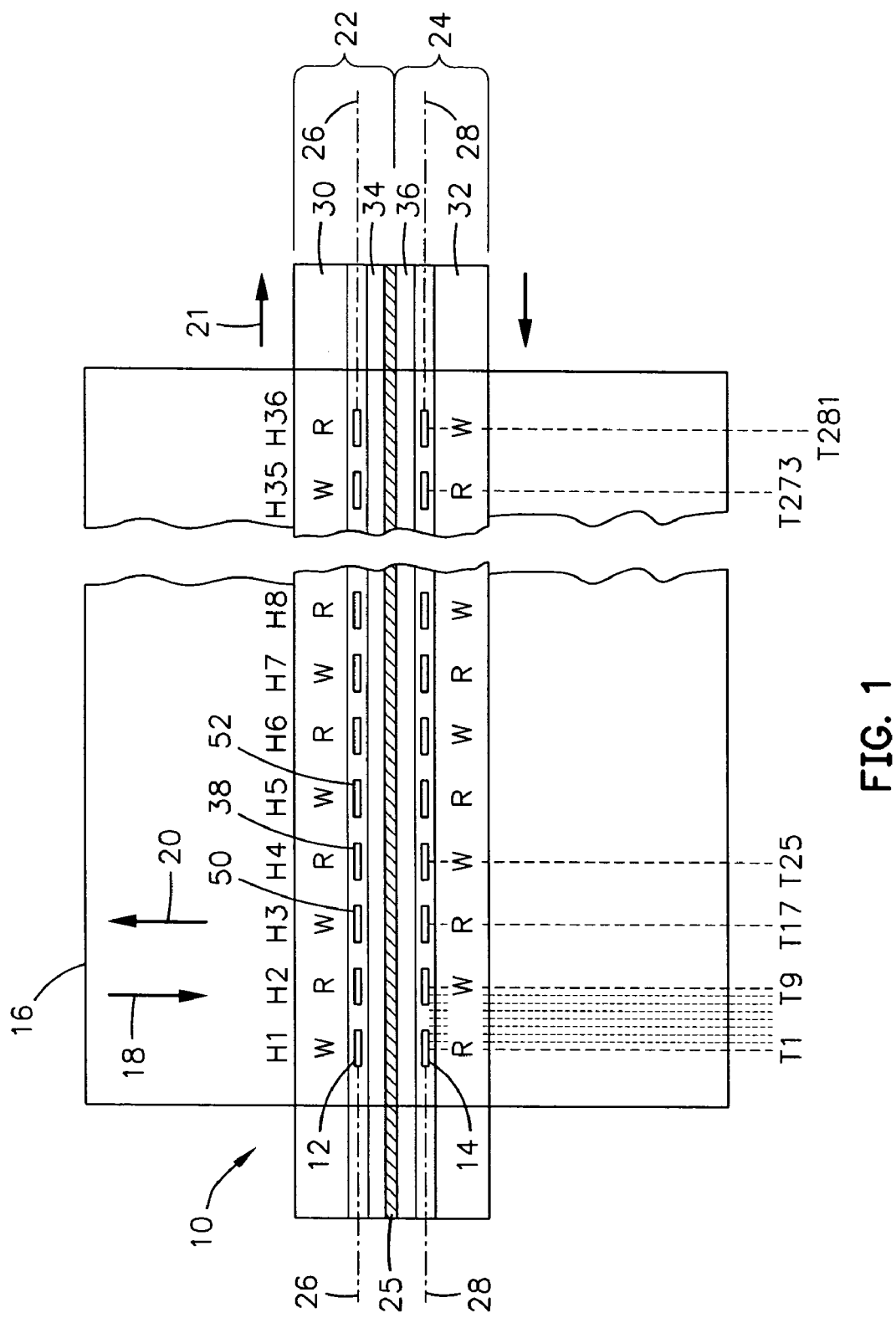
FIG. 1 illustrates a front view of the air bearing surface (ABS) of a prior art magnetoresistive (MR) head assembly in relation to a magnetic tape storage medium.
Figure 2:
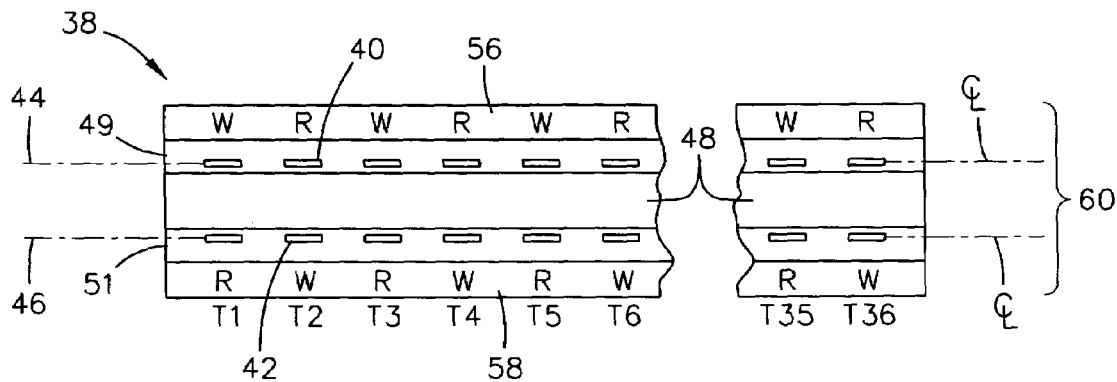
FIG. 2 illustrates a front view of the ABS of a magnetoresistive (MR) head assembly according to the present invention.

FIG. 2 illustrates a front view of the air bearing surface (ABS) of a magnetoresistive (MR) head assembly 38 according to the present invention. Head assembly 38 includes a plurality of read elements marked "R" and a plurality of write elements marked "W" exemplified by the read head 40 and the write head 42, which together form the R/W track-pair 40-42. Read head 40 is disposed at the head gap line 44 and write head 42 is disposed at the head gap line 46. In accordance with this invention, head gap lines 44 and 46 are disposed slightly below opposite surfaces of a single monolithic substrate 48, which are covered by the overcoat layers 49 and 51. As used herein, the term monolithic denominates an undivided seamless piece. Monolithic substrate 48 is fabricated from a single substrate wafer 50 (FIG. 3) by using complete magnetic thin-film processing on both sides 52 and 54 of substrate wafer 50. Note that the head elements exemplified by read head 40 and write head 42 are aligned with readers opposite writers on the opposing sides of monolithic substrate 48, which is built using modified standard thin-film processes for fabricating the magnetic thin-film elements (FIG. 4) and modified substrate lapping procedures. A separate closure piece 56 is bonded to the upper surface of monolithic substrate 48 slightly above head gap line 44 at overcoat layer 49 and another closure piece 58 is bonded to the lower surface of monolithic substrate 48 slightly below head gap line 46 at overcoat layer 51. Monolithic substrate 48 consists preferably of a conductive material (for example, N58 or similar $TiC/Al_2O_3$ ceramic material), which serves to shield the two head gaps within each R/W track pair. However, additional conductive shielding layers may be added during wafer processing. Thus, head assembly 38 includes a single thin-film module 60 that requires no alignment steps after completion of thin-film processing of monolithic substrate 48.

Figure 3:
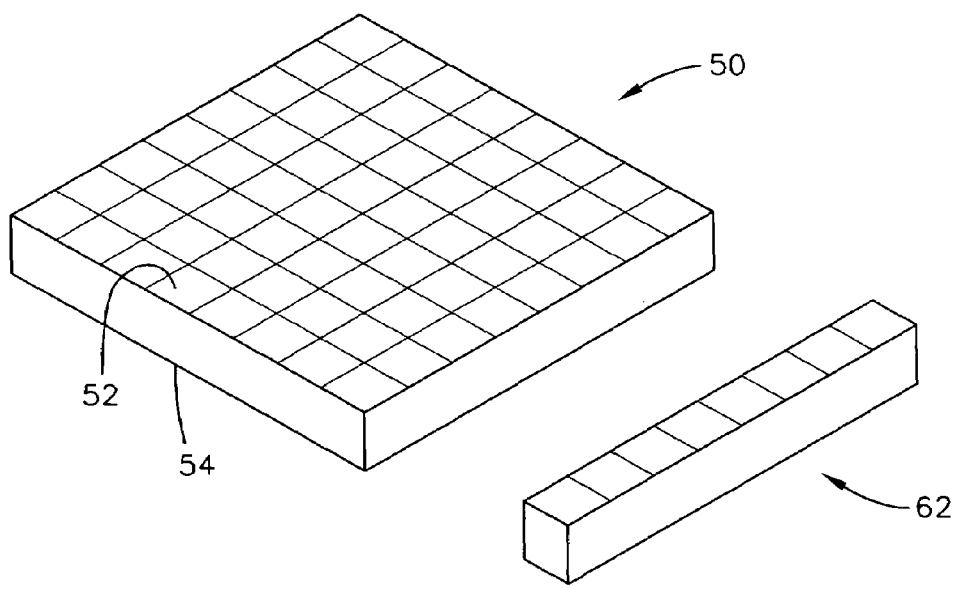
FIG. 3 illustrates a perspective view of a small portion of a monolithic substrate wafer fabricated according to the method of this invention.
Figure 4:
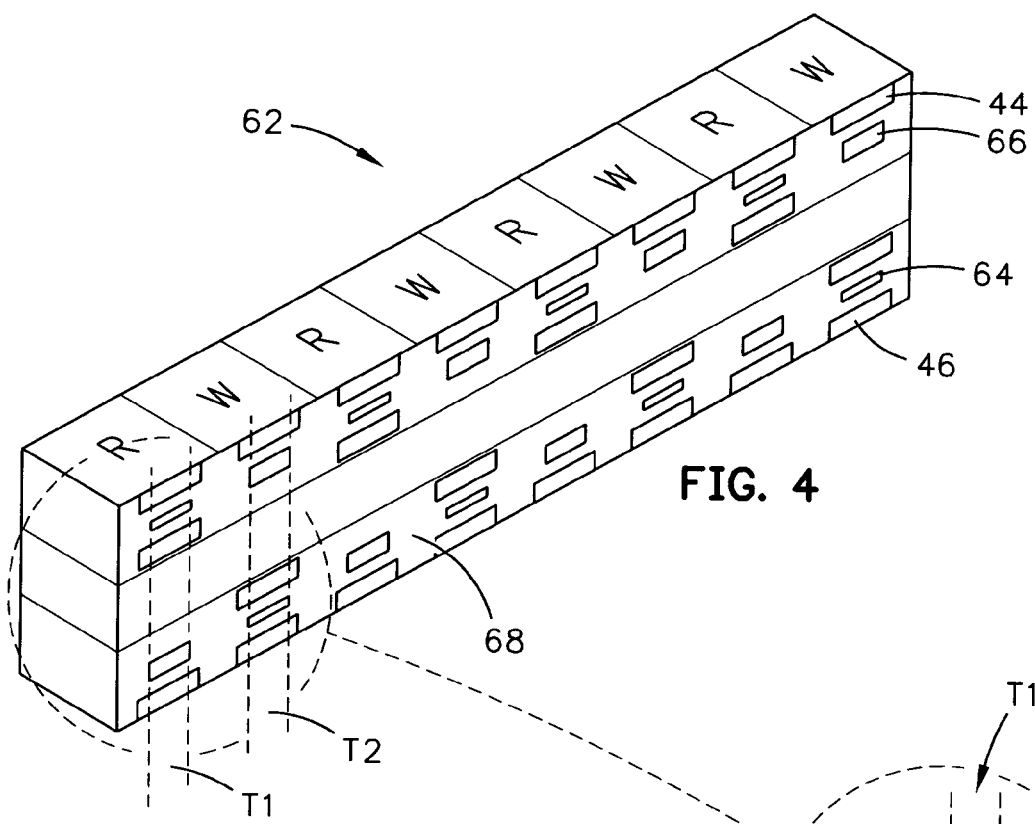
FIG. 4 illustrates a perspective view of a portion of the monolithic substrate wafer after the cutting step of the method of this invention.
Figure 4A:
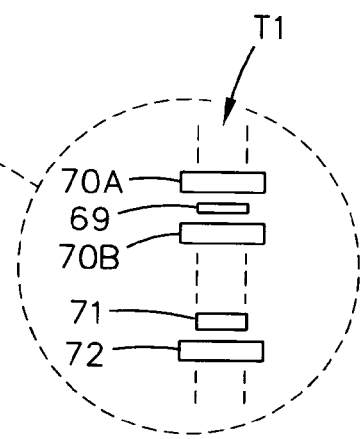

FIG. 3 illustrates a perspective view of a small portion of surface 52 of substrate wafer 50, upon which a plurality of read and write heads are formed using thin-film deposition techniques. It may be readily appreciated that the entire wafer (not shown) provides hundreds to thousands of read/write arrays, each suitable for use in a tape head assembly. Although not visible in FIG. 3, surface 54 has also been processed to form a matching plurality of read and write heads (not shown). A monolithic substrate piece 62 is shown after substrate wafer 50 has been cut to expose the read and a write head and gaps, exemplified by the read head gap 64 and the write head gap 66 (FIG. 4). For expository purposes, monolithic substrate piece 62 is shown as having one row of alternating read and write heads but may include more rows depending on the specific requirements of subsequent lapping and cutting processing steps. Note that the array of read and write heads shown in FIG. 4 is disposed in a checkerboard pattern, which is preferred according to the method of this invention because the same pattern can be used on both sides 52 and 54 of substrate wafer 50 to provide the requisite R/W track-pair dispositions in the completed head assemblies. Also, it may be readily appreciated that each read and write head element shown in FIG. 4 could instead be a "piggy-back" layer of W-over-R elements such that each track-pair includes two W-over-R piggy-back elements instead of the single element pairs shown.

After completion of the read and write heads on a side of the wafer, an overcoat layer, exemplified by the overcoat layers 49 and 51 in FIG. 2, is deposited thereon. The alignment of the thin film layers making up the read and write heads on surface 54 with respect to those deposited on surface 52 may be accomplished using any useful thin-film masking alignment technique known in the art. For example, several through-holes may be formed in the substrate wafer at selected locations and filled with a conductive material, the presence of which would permit automatic sensors to locate and center at the through-holes.

FIG. 4 illustrates an oblique perspective of monolithic substrate piece 62, showing the read and write head gaps exposed on the ABS 68. An exemplary R/W track-pair disposed on the track T1 is shown in detail 4A. The upper read gap includes the magnetoresistive sensor 69 disposed between two magnetoresistive sensor shields 70A and 70B. The lower write gap includes the two pole tips 71 and 72. Note that MR sensor 69 cooperates with pole tip 71 to define the width of track T1 for read-after-write operation, in the usual manner.

Figure 5:
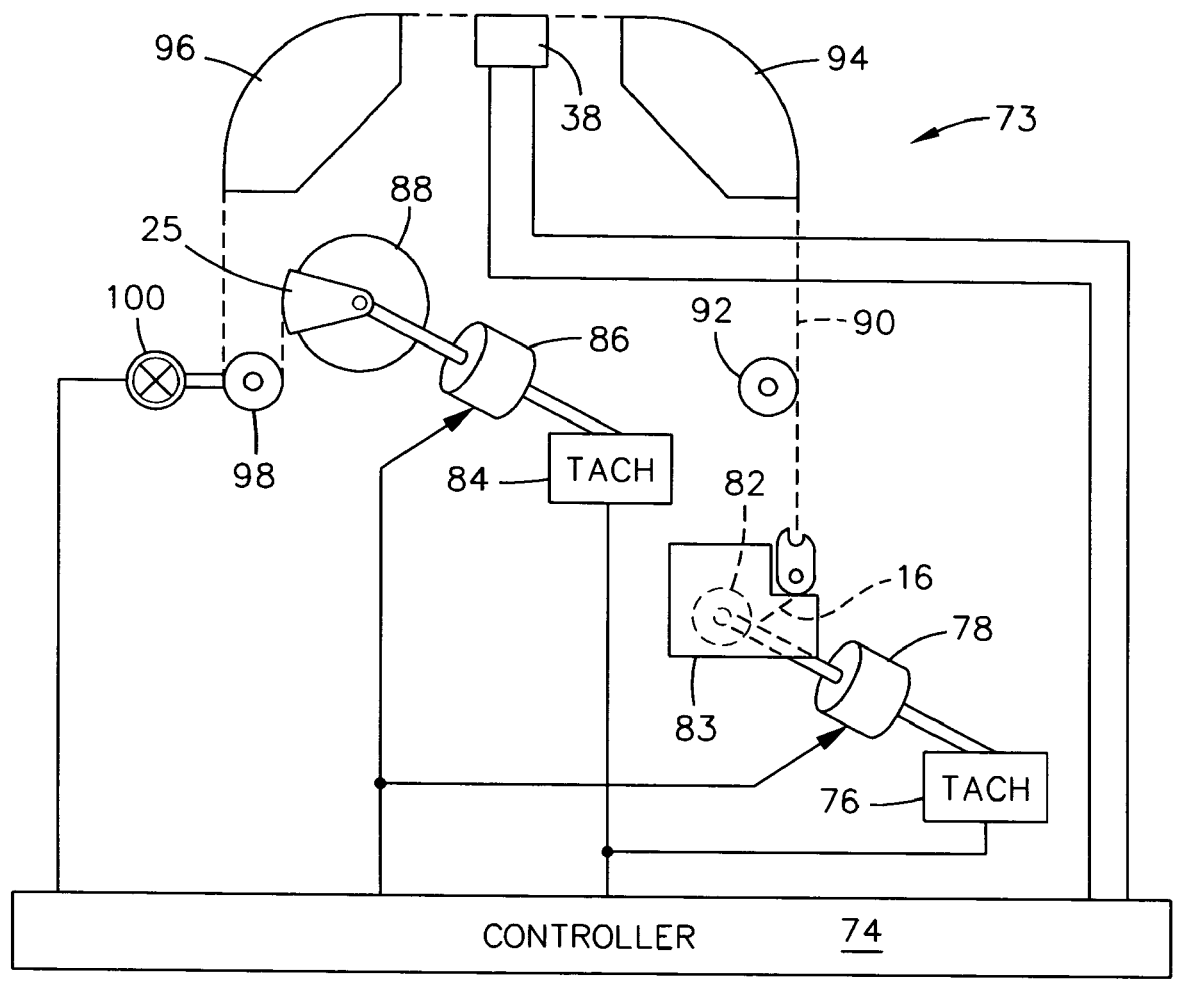
FIG. 5 illustrates a schematic diagram of a magnetic tape drive useful with the magnetic head assembly of this invention.

FIG. 5 shows a schematic diagram of a magnetic tape drive 73 useful with the magnetic head assembly 38 of this invention discussed above in connection with FIGS. 1–4. The controller 74 accepts information from a supply reel tachometer 76, which is coupled to a supply reel motor 78, which is controlled by controller 74 to reversibly rotate a supply reel 82 shown within a single supply reel cartridge 83 (not shown to scale). A take-up reel tachometer 84 is connected to a take-up reel motor 86 that is reversibly driven by controller 74. Take-up reel motor 86 drives a take-up reel 88. Magnetic tape 16 and its leader block moves along a path shown by the dotted line 90, from supply reel 82 past an idler bearing 92, the air bearing tape guides 94 and 96, continuing around a roller 98 coupled a tension arm transducer 100 under the control of controller 74, and therefrom to take-up reel 88, substantially as shown. The resulting output from the read elements in MR head assembly 10 is transmitted to controller 74, which also directs data from an external source to head assembly 10 for transfer onto tape medium 16 through the plurality of write elements in MR head assembly 38. Magnetic tape drive 73 may be generally of the one-half inch type having a single reel cartridge. As is well-known in the tape drive industry, other media formats are also available for example, quarter-inch cartridge (QIC), digital linear tape (DLT), digital analog tape (DAT), and the like.

Figure 6:
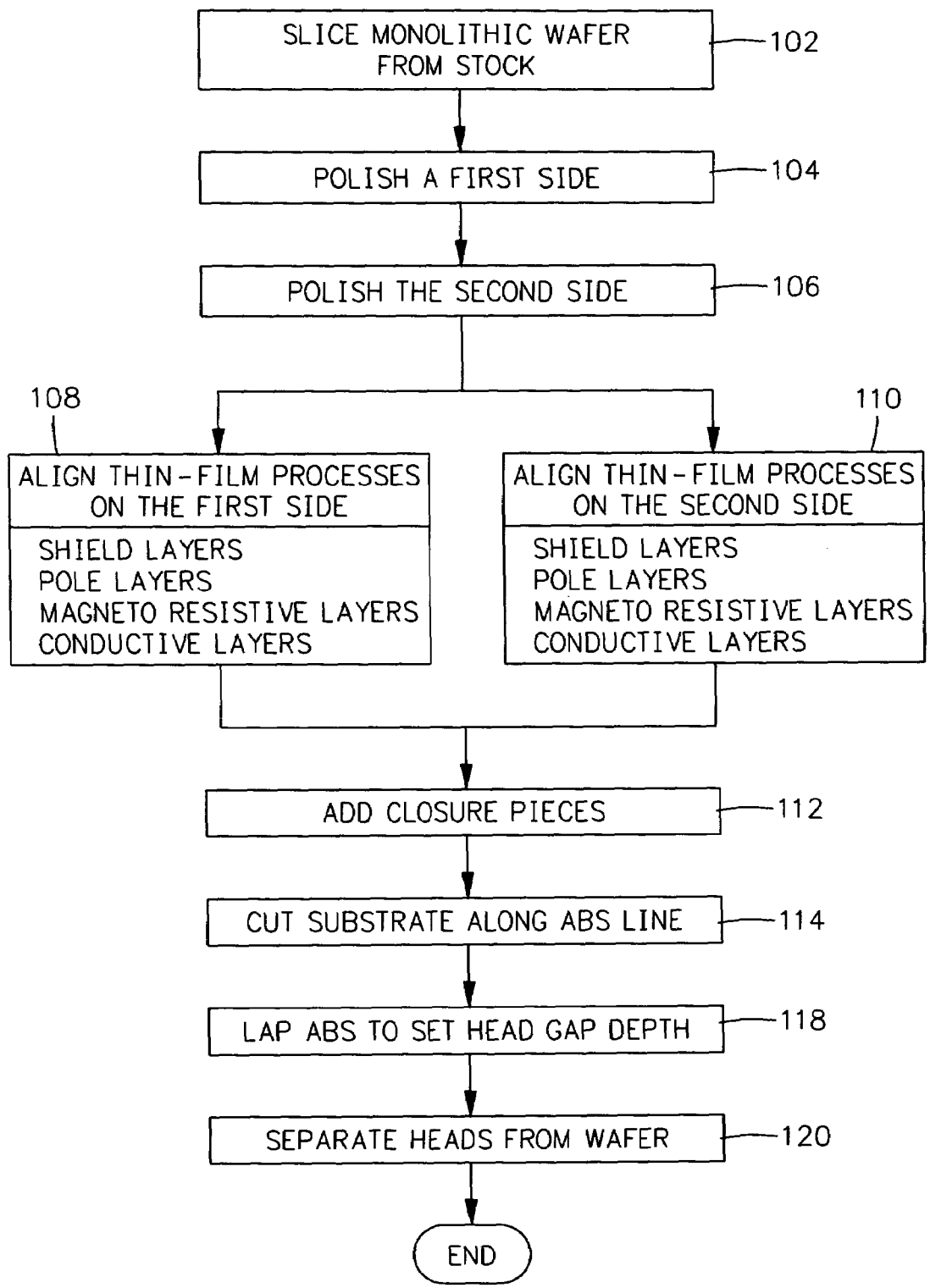
FIG. 6 illustrates a block diagram of a flow chart illustrating the method of this invention.

FIG. 6 shows a block diagram illustrating the method of this invention for fabricating a tape head assembly. In the first step 102, a monolithic substrate wafer is separated from stock. In the step 104, one side of the monolithic wafer is polished to prepare it in the usual manner for deposition of the magnetic thin-film layers required to form the first array of read and write heads. In the step 106, the other side is similarly polished and prepared for thin-film deposition processing of the second array of read and write heads.

In the step 108, the various magnetic thin-film layers are deposited on the first side of the monolithic substrate wafer using any useful magnetic thin-film fabrication technology known in the art for fabricating magnetoresistive sensors and magnetic pole gaps for write heads. In step 108, micron and submicron layers of magnetic or conductive materials are deposited to form shields, pole tips, magnetoresistive sensors, magnetic biasing layers, conductive elements, and non-magnetic spacing layers, for example.

Similarly, in the step 110, the various magnetic thin-film layers are deposited on the second side of the monolithic substrate wafer. In step 110, submicron layers of magnetic or conductive materials are deposited in the same fashion as was accomplished in step 108, except that the thin-film processes of step 110 must be aligned with the layers deposited on the first side in step 108. This alignment may be accomplished using any useful method for such alignment known in the art. For example, several through-holes may be formed in the substrate wafer at selected locations and filled with a conductive material, the presence of which would permit automatic sensors to locate and center at the through-holes. Such automated location means would then be used to locate deposition masks on either side of the substrate wafer during any part of the process, for example.

Because of the high-temperature annealing process for certain magnetic layers, it may be preferable to interleave the elements of steps 108 and 110 to avoid ruining the magnetic layers already deposited on one side during annealing of the other side of the wafer. In the step 118, the two closure pieces are bonded to the two surfaces of the monolithic substrate. This permits completion of quality control (QC) testing (not shown) before attaching the cables to the MR head assembly thereby avoiding unnecessary cable wastage.

In the step 112, the substrate wafer is cut along the ABS line to expose the head gaps formed in the earlier steps 108–110. This exposed ABS surface is then lapped in the step 114 to refine the depths of the exposed head gaps as necessary. The lapping process of step 114 is modified from the usual lapping process to allow simultaneous control of head gap depth for the head gaps at both sides of the monolithic substrate. This modification involves adjusting the angle of lapping and providing electronic lapping sensors for both sides of the substrate wafer. In the step 120, the MR head assembly is separated from the unneeded portion of the substrate wafer. The procedure discussed herein with respect to FIG. 6 is intended to be exemplary. It is readily apparent to skilled practitioners in the art that the exact sequence of the processing steps may be rearranged to accommodate various useful thin-film processes known the art.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A process for fabricating a thin-film magnetic head having an air bearing surface, the method comprising the unordered steps of:
   (a) polishing a surface of a first side of a monolithic substrate wafer;
   (b) forming a first array of magnetic read head structures and magnetic write head structures on the surface of the first side of the monolithic substrate wafer, each magnetic read head structure and magnetic write head structure having a head gap;
   (c) polishing a surface of a second side of the monolithic substrate wafer;
   (d) forming a second array of magnetic read head structures and magnetic write head structures on the surface of the second side of the monolithic substrate wafer, the second array of magnetic read head structures and magnetic write head structures disposed such that the magnetic read head gaps on the first monolithic substrate surface are aligned with the magnetic write head gaps on the second monolithic substrate surface to form a read/write track-pair;

(e) cutting the monolithic substrate to expose the head gaps of a plurality of read/write track-pairs; and (f) lapping the air bearing surface to refine the depth of the exposed head gaps.

2. The method of claim 1 wherein the first and second arrays of magnetic read head structures and magnetic write head structures are disposed such that each read head structure is covered by a collocated write head structure in a piggy-back configuration.

3. The method of claim 2 wherein each of the magnetic read heads includes a magnetoresistive (MR) sensor element.

4. The method of claim 1 further comprising the step of:

(h) cutting the monolithic substrate to separate a thin-film magnetic head having a single read/write track-pair from the monolithic substrate.

5. The method of claim 4 wherein each of the magnetic read heads includes a magnetoresistive (MR) sensor element.

6. The method of claim 1 wherein each of the magnetic read heads includes a magnetoresistive (MR) sensor element.

* * * * *